(No Model.)
G. PALM.
CASING CUTTER.
No. 543,265. Patented July 23, 1895.
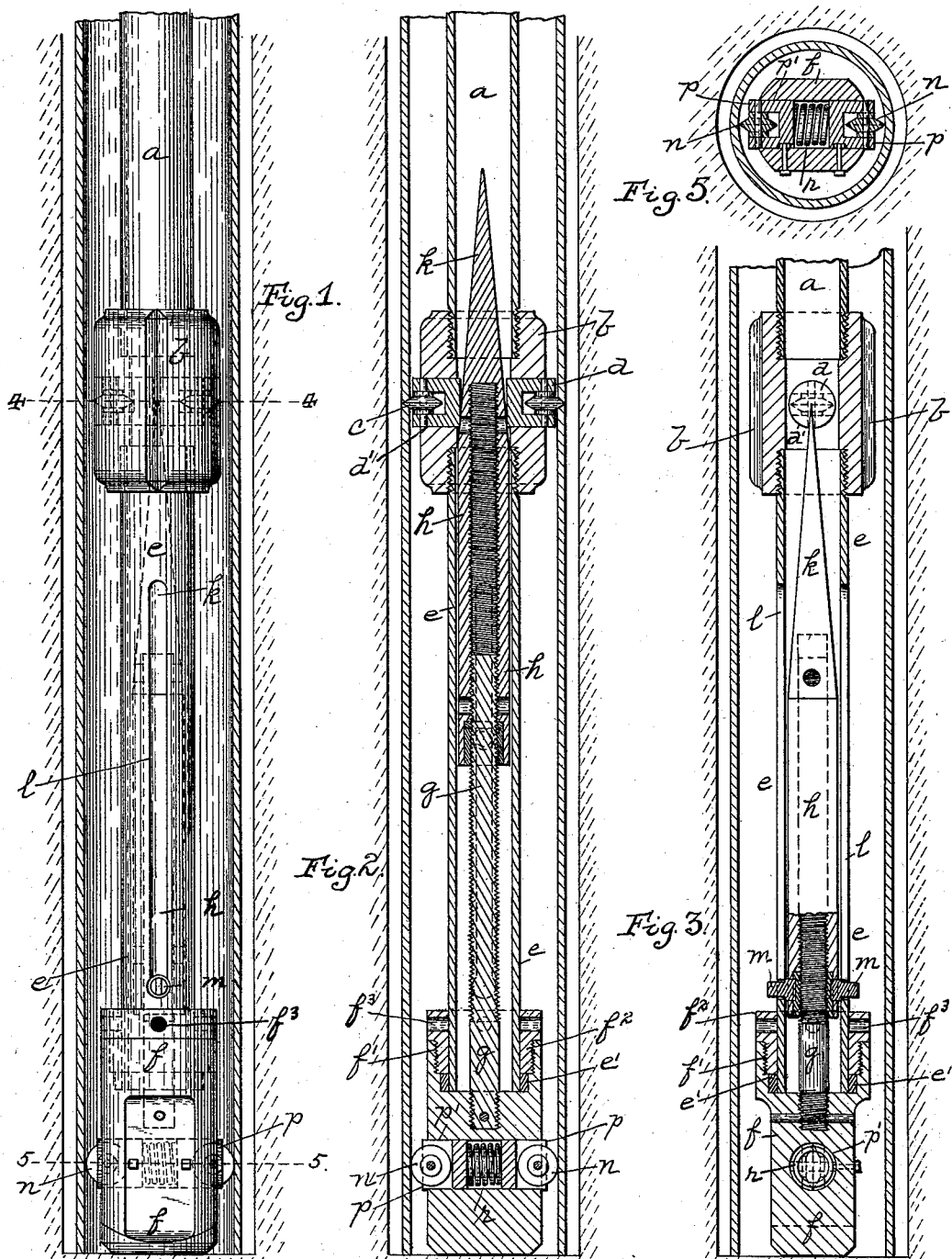
Witnesses:
J. M. Kay
L. H. Kuff
Inventor:
George Palm.
By Kay, Totten & Cooke,
Attorneys.

UNITED STATES PATENT OFFICE.

GEORGE PALM, OF BUTLER, PENNSYLVANIA.

CASING-CUTTER.

SPECIFICATION forming part of Letters Patent No. 543,265, dated July 23, 1895.

Application filed February 1, 1894. Serial No. 498,743. (No model.)

*To all whom it may concern:*

Be it known that I, GEORGE PALM, a resident of Butler, in the county of Butler and State of Pennsylvania, have invented a new and useful Improvement in Casing-Cutters; and I do hereby declare the following to be a full, clear, and exact description thereof.

My invention relates to machines for cutting casing or tubing within the wells.
It is a well-known fact that after the well has been used and the supply of gas or oil therefrom is exhausted it is very desirable to remove therefrom the casing or tubing for use in other wells, and it is sometimes necessary to remove the same even in producing wells. The walls of the well, however, will crack and break up, the broken or powdered rock packing around the tubing, so that the entire length of casing cannot be jarred and loosened and removed from the well, and the custom has been to cut the casing at certain points and then jar loose the sections and withdraw them. The ordinary casing-cutter has been operated in such a way as to force out cutters or cutting-wheels as the same were rotated and by means of a wedge in the casing-cutter force out the cutters until they cut through the casing, the ordinary construction of casing-cutter having a long wedge, and having a threaded bar extending from the small end of the wedge, which engages with a nut and moves the wedge, so as to force out the cutters, which are mounted to slide on seats in the casing-cutter. The space within the well is limited, however, and in order to arrange the threaded bar at the small end of the wedge it has been found that the sliding bearings for the cutting-wheels could not be made as long as desirable, and the main object of the present invention is to provide a means by which a long bearing for the cutting-wheels can be obtained.

To this end my invention consists, generally stated, in the employment with a casing-cutter of a lower section engaging with the wall, so as to prevent the rotation thereof, and having a threaded bar extending up from the same, and an upper section carrying a long nut or interiorly-threaded tube, above which is a wedge, the base or larger part of which is connected to the nut and operates between the bearings of the cutting-wheels to force the same outwardly, the two sections being swiveled together and the nut being mounted to turn with the upper section, and so, through the threaded bar and nut, force the wedge between the cutting-wheels and cause the cutting of the tubing. The special points of invention desired to be covered will be hereinafter more particularly set forth and described.

To enable others skilled in the art to make and use my invention, I will describe the same more fully, referring to the accompanying drawings, in which—

Figure 1 is a side view of the casing-cutter within the well, the casing being shown in section and the cutting-wheels withdrawn within the casing-cutter. Fig. 2 is a sectional view of the casing-cutter within the well, showing the position of the tool at the end of the cutting operation. Fig. 3 is a side view, partly in section, at right angles to Fig. 2 and showing the position of the wedge with relation to the cutting-wheels when it is only partly advanced. Fig. 4 is a cross-section on the lines 4 4, Fig. 1; and Fig. 5 is a cross-section on the lines 5 5, Fig. 1.

Like letters of reference indicate like parts in each view.

The casing-cutter is connected by a string of tubing, such as $a$, with the upper part of the well, sections of such tubing being screwed together, and the casing-cutter lowered by this means into the well. It has the cutter-head $b$, in which are mounted the cutting-wheel $c$, such cutting-wheels being mounted in bearings $d$, which slide in seats $d'$ in the cutter-head. Depending from the cutter-head $b$ is the tube $e$, which has a swivel connection with the base $f$, such swivel connection being more clearly shown in Figs. 2 and 3, the tube $e$, having the flange $e'$, which fits within the annular threaded extension $f'$ of the base $f$, and a collar $f^2$, screwing into said extension above the flange $e'$ of the tube $e$, and so forming a swivel connection between the parts. The collar $f^2$ has seats $f^3$ extending into the same to provide for the screwing up of the collar. Rigidly secured to the base $f$ is the threaded bar $g$, which extends up within the tube $e$ and engages with the interiorly-threaded nut $h$, which nut carries at the upper end thereof the wedge $k$, that wedge being a long thin wedge, tapering practically to a point and fitting, as shown in Fig. 4, between the bearings $d$ of the cutter-wheels $c$. I am enabled by this construction to employ a very narrow wedge $k$ and one which tapers practically to a point, and therefore to employ long bearings for the cutter-wheels in the cutter-head $b$. In order to rotate the nut $h$, which must be turned with relation to the base $f$, I form in the tube $e$ the longitudinal slots $l$, and upon the nut $h$ I secure the lugs $m$, which extend out through said slots $l$, and so provide for the turning of the nut $h$ and wedge $k$ with the cutter-head $b$ and tube $e$. Any suitable means for causing the base $f$ to engage with the casing and prevent the turning of the base $f$ may be employed, that shown in the drawings being the spring-operated wheels $n$, which are mounted in bearings $p$, sliding in seats $p'$ in the base, and between which I place the spring $r$, the spring acting on both of said wheels and forcing them into engagement with the casing with force sufficient to hold the base from turning. The outward movement of the said bearings $p$ of the wheels $n$, as well as the bearings $m$ of the cutting-wheels $c$, may be limited in any suitable way.

In the operation of the tool it is screwed upon the section $a$ of tubing by means of which it is lowered, and like sections of tubing are added until the casing-cutter is lowered into the well to the position at which the cut is to be made. In its downward passage within the well the spring $r$ will force out the wheels $n$ in the base $f$ and cause the same to engage with the casing with sufficient force to prevent the turning of the head, and when the tool is brought to the desired position the operator, by suitable means at the top of the string of tubing, turns the same to the right, so as to prevent the unscrewing of any joints connecting the sections, and as he rotates the same he turns the cutter-head and tube $e$ with the tubing, and through the lugs $m$ he turns the nut or interiorly-threaded tube $h$ upon the bar $g$, which is held stationary with the base $f$. As a result of this operation the wedge $k$ is gradually raised and forces out the cutting-wheels $c$, which engage with the tubing and gradually cut through the same, being gradually advanced by means of the wedge $k$, until a cut is made entirely through the casing. When the casing is cut, as above described, the operator then turns the string of tubing in the opposite direction, and in this way turns the nut $h$ upon the threaded bar $g$ and gradually draws down the wedge $k$, so as to permit the cutting-wheels $c$ to be carried back into the cutter-head $b$, and as soon as the wheels are thus withdrawn, either by springs connected to their bearings or by the pressure on the casing or the longitudinal movement of the casing-cutter after the cut is made, the casing-cutter can be raised from the well. It is then only necessary to jar loose the upper section of tubing which has been cut from that below the same and withdraw it from the well, and the operation of cutting can be again repeated at a lower point in the well, as may be desired. I am in this way enabled to obtain a very much stronger and more efficient casing-cutter, for the reason that the bearings for the cutting-wheels may be made longer and a firmer support for the same be obtained on the cutter-head without increasing the diameter of the head, because a very much thinner wedge for spreading the cutting-wheels can be employed.

What I claim as my invention, and desire to secure by Letters Patent, is—

1. In casing cutters, the combination of a cutter head carrying cutters, a body portion having a swiveling connection therewith and held from turning, a threaded bar, a nut, and a wedge above the same having its larger end connected to the nut and extending between the cutters, substantially as set forth.

2. In casing cutters, the combination of a cutter head carrying cutters, a base having a swiveling connection therewith and held from turning, a threaded bar held by the base, and a nut rotating with the head and connected to the larger end of a wedge, which extends between the cutters, substantially as set forth.

3. In casing cutters, the combination of a cutter head carrying cutters, a tube extending below the same, a base with which said tube has a swiveling connection, a threaded bar secured to the base, a nut within the tube extending below the cutter head and having a sliding connection therewith, and a wedge having its larger end connected to the nut and engaging with the cutters, substantially as set forth.

4. In casing cutters, the combination of a cutter head carrying cutters, a tube extending below the same and having longitudinal slots therein, a base having a swiveling connection with the tube, a threaded bar secured to the base, a nut within the slotted tube and having lugs extending within the slots thereof, said nut engaging with the threaded bar, and a wedge having its larger end connected to the nut and extending between the cutters, substantially as set forth.

In testimony whereof I, the said GEORGE PALM, have hereunto set my hand.

GEORGE PALM.

Witnesses:
J. N. COOKE,
L. H. KNOX.